US006636994B1

(12) United States Patent
Waschura et al.

(10) Patent No.: US 6,636,994 B1
(45) Date of Patent: Oct. 21, 2003

(54) APPARATUS AND METHOD FOR EXAMINING BIT VALUES DURING BIT ERROR LOCATION MEASUREMENTS

(75) Inventors: Thomas Eugene Waschura, San Carlos, CA (US); James Roger Waschura, Los Altos Hills, CA (US)

(73) Assignee: Synthesys, Menlo Park, CA (US)

( * ) Notice: Subject to any disclaimer, the term of this patent is extended or adjusted under 35 U.S.C. 154(b) by 0 days.

(21) Appl. No.: 09/580,025

(22) Filed: May 26, 2000

(51) Int. Cl.$^{7}$ .............................................. G06F 11/00

(52) U.S. Cl. ...................................... 714/704; 714/707

(58) Field of Search ......................... 235/466; 342/172; 360/53; 375/368, 116; 714/715, 704, 707

(56) References Cited

U.S. PATENT DOCUMENTS

| | | | | | |
|---|---|---|---|---|---|
| 3,978,319 | A | * | 8/1976 | Vinal | 235/466 |
| 4,507,783 | A | | 3/1985 | Austin et al. | 371/49 |
| 5,297,185 | A | | 3/1994 | Best et al. | 375/116 |
| 5,305,323 | A | | 4/1994 | Lada | 371/5.1 |
| 5,414,713 | A | | 5/1995 | Waschura et al. | 371/20.4 |
| 5,661,763 | A | | 8/1997 | Sands | 375/368 |
| 5,943,377 | A | | 8/1999 | Hedman et al. | 375/368 |
| 5,973,638 | A | * | 10/1999 | Robbins et al. | 342/172 |
| 6,005,731 | A | * | 12/1999 | Foland, Jr. et al. | 360/53 |
| 6,084,734 | A | * | 7/2000 | Southerland et al. | 360/53 |
| 6,147,827 | A | * | 11/2000 | Southerland et al. | 360/53 |

* cited by examiner

*Primary Examiner*—David Ton
(74) *Attorney, Agent, or Firm*—Peninsula IP Group; Douglas A. Chaikin

(57) ABSTRACT

Disclosed herein is a method for determining the location of at least one error in a digital data stream and identifying the data surrounding the error which comprises selecting a user data stream to be analyzed for errors, selecting a seed bit segment out of the user data stream and converting that to a reference data stream, synchronizing the reference data stream with the user data stream, determining if an error exists, if an error has occurred calculating where on the data stream the error occurred, comparing the data stream segment containing the error with the reference data stream, analyzing the data surrounding the error, and computing actual data values from phase, data type and error location.

10 Claims, 1 Drawing Sheet

APPARATUS AND METHOD FOR EXAMINING BIT VALUES DURING BIT ERROR LOCATION MEASUREMENTS

BACKGROUND OF THE INVENTION

1. Field of the Invention

This invention relates to a method of determining errors in data values. More particularly, this invention relates to a method of determining errors in data transmitted in a high-speed bit stream. Still more particularly, this invention relates to a method of analyzing data surrounding errors in a high-speed bit stream.

2. Relevant Art

There are many ways to transmit data from one location to another, but the most common means of transmission in the current era is through digital transmission. The electronic circuitry in computers, digital telephones and other types of electronic equipment detects the difference between two states (high voltage and low voltage), and represents these states as one of the two numbers in a binary system, 1 or 0. A bit is the basic unit of information in a binary numbering system. A byte is eight bits.

Building a reliable circuit that tells the difference between 1 and 0 is relatively easy, thus computers and other digitally operated electronic devices are reasonably accurate in their internal processing capabilities. However, errors do occur for a number of reasons. For example, component parts in equipment sometimes fail. When that happens, it is important to be able to trouble shoot to determine which component part failed. This is sometimes possible to do by analyzing the digital data stream generated as it passes through the piece of equipment.

Whenever data is being transferred from one location to another, as in telecommunications where bit information in the form of bit streams is transferred over long distances, it is important to be able to detect and fully understand the nature of each of these errors occuring in the bit (data) stream.

Bit error testers are used to measure the quality of storage and communication of digital information. Early bit error testers simply counted the number of errors found during a measurement and, along with knowing the number of bits that were looked at during the measurement, would display the average error rate. Representative art includes U.S. Pat. No. 3,976,864, which discloses apparatus and a method for testing digital circuits. U.S. Pat. No. 4,060,797 discloses a serial bit stream code detector. U.S. Pat. No. 4,847,877 discloses a method and apparatus for detecting a predetermined bit pattern within a serial bit stream. U.S. Pat. No. 4,507,783 discloses error detection circuitry for digital systems.

A previous invention by these inventors, namely U.S. Pat. No. 5,414,713 is incorporated herein by reference in its entirety. That patent discloses a device having the ability to identify, log and study error location information in digital channels. This error location information comprises a list of each bit location where errors in the data stream occur. Error events in and of themselves can identify the location of errors inside a data stream, but they do not define the actual data that is being transmitted when the error occurs. The value of the data at and around, i.e., surrounding, errors is additional information that can be used along with the bit error location to more completely analyze errors to determining their cause. Knowledge of this kind is necessary in order for improved devices to be designed and manufactured, and for ongoing quality control during the transmission of data.

Knowing what the data values are in relation to error locations enables studying correlations between the errors and the data patterns. Creating a way to know where all errors occur in a data stream and a means to calculate what the data is at or around the error location is the subject of this invention.

SUMMARY OF THE INVENTION

It is an object of this invention to provide a method for determining the location of errors in a digital data stream.

It is also an additional object of this invention to provide a method for calculating the data values at and adjacent to the location of errors in a digital data stream.

It is a still further object of the invention to provide a method of analyzing the data surrounding an error or errors in a digital data stream.

In accordance with the above objects and those that will be mentioned and will become apparent below, the invention comprises:

A method for determining the location of at least one error in a digital data stream and identifying the data on both sides of the error which comprises:

(a) selecting a user data stream to be analyzed for errors, said data stream consisting of a linear bit stream of 0's and 1's in a predetermined sequence, (b) selecting a bit seed segment out of said data stream, and converting said bit seed segment into a reference data stream, (c) synchronizing said reference data stream with said user data stream to be tested and simultaneously storing additional information about phase and data type of said user data stream into a computer memory bank, (d) determining if an error exists, (e) if an error exists calculating where on the user data stream said error occurred, (f) analyzing the data surrounding the error that is stored in the computer memory bank, and (g) computing actual data values from phase, data type and error location.

In a preferred embodiment of the invention, a 32-bit wide data stream is used as the user's input data and the locally created reference bit stream.

It is an advantage of this invention to a provide a method of determining the location of errors in a data stream, and of calculating the data values adjacent or surrounding the error(s) in order for more accurate information to be obtained about the location of the error(s). The method of the invention enables better maintenance of equipment, and more efficient and reliable transmission of digital data to be obtained.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
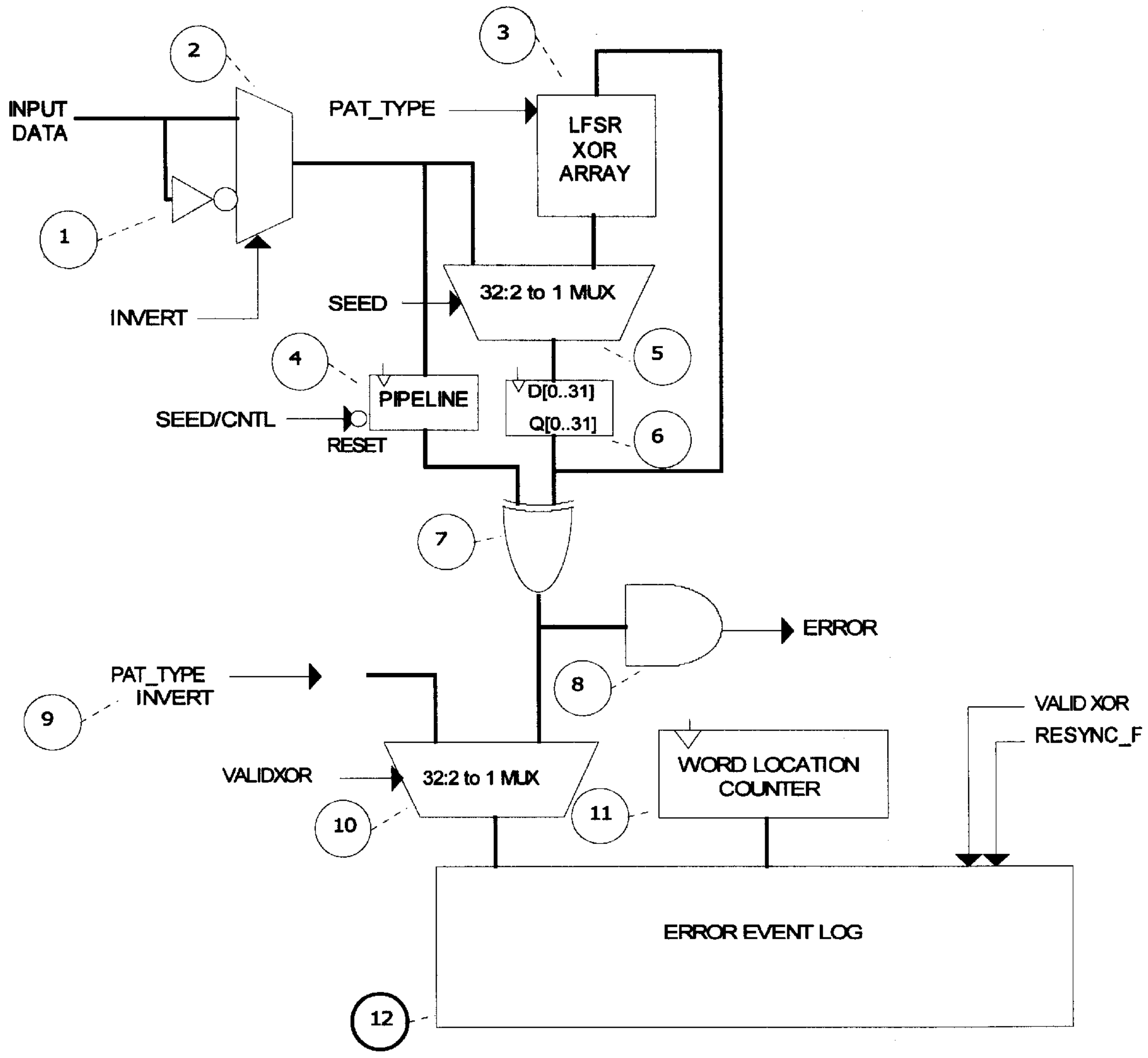
FIG. 1 is a block diagram illustrating the method of the invention.

Bit error rate testers rely on knowing a reference data stream to use to compare an input data stream against when identifying errors. By definition, any unexpected results in a data stream are considered error events. Devices for detecting error events are described in U.S. Pat. No. 5,414,713, previously referred to herein and specifically incorporated herein by reference, notably incorporating the definition of error event stream format found therein.

In the method of the invention, a user bit stream is selected for analysis. From this bit stream a seed bit segment is obtained, and a reference bit stream is generated from the seed bit segment by loading a linear feedback shift register (LFSR). Thereafter, the reference bit stream is synchronized with the user bit stream so that data in the user bit stream and the reference stream can be compared. Reference patterns and allowable data streams are not arbitrary sequences. Rather, they are in some way constrained allowing for an error detector to quickly synchronize and then to be able to create a local reference to use for bit comparisons during the actual error rate measurement.

Examples of constraints in these sequences include pseudo-random sequences that can be easily generated with common linear feedback shift registers, or user-defined patterns which, by definition, repeat after some interval of bits.

Because the synchronization process precedes the bit error rate measurement process, by definition, no error locations can exist during the synchronization step. For this reason, it does not detract from error location logging or analysis, to use the same logging mechanism to log the location where synchronization completes and sufficient phase and data type indication to allow later analysis to calculate the data values at and around error locations. Actual data values can be calculated because the reference data type defines the algorithm for creating the data sequence, the phase information defines where to start the algorithm and the difference between the location of any error and the location of the end of resynchronization defines how may steps of the algorithm to take to calculate the data values at each error location.

The above defines a modification of the error event stream format used in the '713 patent. Using this modified event stream format, not only can the user locate the position of all errors in a data stream, but the user can also calculate the data values at and around errors.

With respect to FIG. 1, there is shown the apparatus which embodies the invention generally shown by the numeral 5. The apparatus includes an inverter 10 connected to a 2 to 1 multiplexor 20 and includes an INVERT selection. Additionally, the apparatus 5 includes a second multiplexor 50, a pipeline register 40, an XOR array 30, register 60, XOR gate 70, OR gate 80, multiplexor 100, word location counter 110 and error event log 120.

In an exemplary embodiment, 32-bit wide input user data is presented to both the inverter 10, and the 2 to 1 multiplexor 20. The INVERT selection provided to multiplexor 20 selects whether the input data is inverted or not. This inverted or true data is presented to the pipeline register 40 as well as another 32-bit 2 to 1 multiplexor, 50. The multiplexor 50 selects whether register 60 receives as input either the direct true or inverted user data from multiplexor 20 or the results of XOR array computations computed by the XOR array 30. The XOR array 30 computes different values based on which users pseduo-random source is selected by PAT_TYPE 90. The register 60 received data from the true or inverted user data during the seeding process and this is controlled by the SEED input. During seeding, the register 60 is simply preloaded with user true or inverted data. Once the seed is loaded, the SEED input is changed so that future data input to register 60 is computed through XOR array 30 to create the proper linear feedback shift register pseudo-random data sequence. The pipeline register 40 also receives true or inverted user data from multiplexor 20. The pipeline register 40 can also have its outputs forced to logic zero by the control logic, not shown, on the SEED/CNTL line. This is done to present all logic zeros as the comparison data for XOR gate 70, so that Q[ ] data from the register 60 will flow to the error event log 120.

After a good seed is loaded, the output of register 60 should match with the output of the pipeline register 70. The comparing XOR gates 70 will have 32 logic "0" outputs to indicate that the two 32-bit inputs are the same. Any time an error exists in the users input data, the comparing the XOR gate 70 will have one or more logic "1'" on them. The OR gate 80 looks at all 32 bits coming out of comparing the XOR gate 70 and outputs a logic "1" when any one or more of the 32 bits have a logic "1" on them. This indicates an error and during normal operation instructs the control process (not shown) to enqueue an error event into the error event log 120.

The error event log 120 receives error events during normal operation that hold the 32-bit comparing XOR gate 70 outputs and their word location from word location counter 110. These types of error event log entries can be identified because the VALID_XOR bit is set to logic 1. However, before normal operation, the resynchronization must be done. During resynchronization, the SEED input is toggled for one time period to allow new user data to input directly to the register 60. After the seed is done, the ERROR output from the error OR gate 80 is checked to make sure that a good seed was taken. If a seed or seed checking was done during an error in the user stream, the ERROR output from error OR gate 80 will be high instructing the control logic, not shown, to repeat the seeding process.

Once the seed is input, the SEED/CNTL is set to force the data output from the pipeline register 40 to logic low. This allows XOR gates 70 to pass the Q[ ] values from the register 60 onto the multiplexor 110. During one clock period after the resynchronization, the multiplexor 110 is controlled to present the 32 bits of data from the XOR gate 70 to the error event log 120. This comprises the seeding phase information. During the next clock period another error event will be logged. This one will have the multiplexor 110, change to permit passing the PAT_TYPE 9 and INVERT status through to the error event log 120 for logging. In each case, when ever any error event is logged, the current value of word location counter 110 is also logged.

In this way, error locations along with phase and data type information resulting from resynchronization are present and logged.

The various steps embodied in the preferred embodiment of the method of the invention, a 32-bit wide data stream is used as the user's input data and the locally created reference data stream. User data streams can be true or logically inverted pseudo-random data streams chosen from a list of supported data pseudo-random streams (e.g. $2^n-1$, n=7, 15, 20, 23 and 31). Pseudo-random data streams repeat after a different number of bits depending on the degree of the defining polynomial. For example, a $2^7-1$ pattern repeats every 127 bits where a $2^{31}-1$ pattern repeats every 2,147, 483,647 bits. Reference data streams in this embodiment are calculated using a 32-bit wide linear feedback shift register (LFSR). Once the LFSR is loaded with 32-bits of the data sequence, every subsequent shift (clock tick) of the LFSR will result in computing the next 32 bits of the sequence. Feedback shift registers and pattern generators are well known in the art and described in U.S. Pat. No. 5,414,713.

The following set of equations define the LFSR used for generating 32-bits of a $2^7-1$ pattern. In each case, the next thirty-two D[ ] values are computed by using the last thirty-two Q[ ] values. Other pseudo-random polynomials are computed in a similar fashion by logically exclusive Oring (XOR) various combination of feedback bit positions.

TABLE 1

| |
|---|
| D[0] = Q[2] XOR Q[3] XOR Q[4] XOR Q[6] |
| D[1] = Q[0] XOR Q[3] XOR Q[4] XOR Q[5] XOR Q[6] |
| D[2] = Q[0] XOR Q[1] XOR Q[3] XOR Q[5] |
| D[3] = Q[1] XOR Q[2] XOR Q[5] XOR Q[6] |
| D[4] = Q[0] XOR Q[2] XOR Q[3] |
| D[5] = Q[1] XOR Q[3] XOR Q[4] |
| D[6] = Q[2] XOR Q[4] XOR Q[5] |
| D[7] = Q[3] XOR Q[5] XOR Q[6] |
| D[8] = Q[0] XOR Q[4] |
| D[9] = Q[1] XOR Q[5] |
| D[10] = Q[2] XOR Q[6] |
| D[11] = Q[0] XOR Q[3] XOR Q[6] |
| D[12] = Q[0] XOR Q[1] XOR Q[4] XOR Q[6] |
| D[13] = Q[0] XOR Q[1] XOR Q[2] XOR Q[5] XOR Q[6] |
| D[14] = Q[0] XOR Q[1] XOR Q[2] XOR Q[3] |
| D[15] = Q[1] XOR Q[2] XOR Q[3] XOR Q[4] |
| D[16] = Q[2] XOR Q[3] XOR Q[4] XOR Q[5] |
| D[17] = Q[3] XOR Q[4] XOR Q[5] XOR Q[6] |
| D[18] = Q[0] XOR Q[4] XOR Q[5] |
| D[19] = Q[1] XOR Q[5] XOR Q[6] |
| D[20] = Q[0] XOR Q[2] |
| D[21] = Q[1] XOR Q[3] |
| D[22] = Q[2] XOR Q[4] |
| D[23] = Q[3] XOR Q[5] |
| D[24] = Q[4] XOR Q[6] |
| D[25] = Q[0] XOR Q[5] XOR Q[6] |
| D[26] = Q[0] XOR Q[1] |
| D[27] = Q[1] XOR Q[2] |
| D[28] = Q[2] XOR Q[3] |
| D[29] = Q[3] XOR Q[4] |
| D[20] = Q[4] XOR Q[5] |
| D[31] = Q[5] XOR Q[6] |

Using these equations, a $2^7-1$ pseudo-random sequence would be shown, both in binary and hexadecimal values (Table 2, below).

TABLE 2

| BINARY | HEXADECIMAL |
|---|---|
| 00011010010111011100110010101011 | 1A5DCCAB |
| 11111000000100000110000101000111 | F8106147 |
| 10010001011001110101001111101000 | 916753E8 |
| 01110001001001101101011011110110 ^* | 7126D6F6 |
| 00110100101110111001100101010111 | 34BB9957 |
| 11110000001000001100001010001111 | F020C28F |
| 00100010110011101010011111010000 | 22CEA7D0 |

(*notice how the sequence begins to repeat after 127 bits).

To synchronize the reference data stream to the incoming data stream, the LFSR contents are first loaded with a single 32-bit value (a "seed" value) taken from the incoming user data stream. After this synchronization seeding is done, the reference LFSR generator will produce a 32-bit wide reference data stream in-step with the user's input data stream such that it can be used to compare against to identify any future errors in the input data stream.

There is a possibility that an error occurs in the user's data sequence precisely in the value that is used as the synchronizing "seed" value. This is found immediately because the resulting reference data pattern will produce an enormously high error rate and a monitoring algorithm is employed to simply request a new seed value be taken. It is desirable to minimize the number of samples required to properly synchronize: however, even taking tens of 32-bit samples is reasonable.

At the end of successful synchronization, a 32-bit data value from the reference data stream is logged along with the word counter value representing when the synchronization is complete. In a subsequent logging record, a value indicating the polynomial type (e.g. $2^7-1$) and whether or not the data sequence had to be inverted to successfully find synchronization, is logged.

After proper synchronization and the logging of synchronization information, 32-bit wide comparisons between the reference pattern and the user's pattern are constantly computed to find errors. Any mis-match between these patterns constitutes one to 32 bits of error in the word. By logging the word counter and a 32-bit wide exclusive-OR between the user's input data and the reference pattern, the exact bit location of all errors can be analyzed.

The following table (Table 3) is an example of this process. Each line represents one time slice where 32 bits of data are analyzed. Data sequences are shown in hexadecimal. An error will be introduced in time slot 7 where the data 22CEB7D0 will be input by the user when, in fact, the correct PN7 sequence would have been 22CEA7D0. This translates to an error in the twelfth position where the bit level of 0 was expected and a 1 will be received.

TABLE 3

| Time | User Input Sequence | Action | Reference Sequence | Comments/Logging |
|---|---|---|---|---|
| 1 | 1A5DCCAB | Seed -> | 1A5DCCAB | |
| 2 | F8106147 | | F8106147 | Perfect match, resync claimed done |
| 3 | 916753E8 | | 916753E8 | LOG: <Addr:3> <Resync Done> 916753E8 |
| 4 | 7126D6F6 | | 7126D6F6 | LOG: <Type=PN7, non-inverted> |
| 5 | 34BB9957 | | 34BB9957 | |
| 6 | F020C28F | | F020C28F | |
| 7 | 22CEB7D0 | Error | 22CEA7D0 | LOG: <Addr:7> 00001000 <Type=XOR> |

The following table (Table 4) demonstrates a similar example with the addition of a bad synchronization step requiring a second seed before successful synchronization can be concluded.

TABLE 4

| Time | User Input Sequence | Action | Reference Sequence | Comments/Logging |
|---|---|---|---|---|
| 1 | 1A5DCCAB | Seed -> | 1A5DCCAA | Seed during an error |
| 2 | F8106146 | | FE041851 | No Match, try seeding again |
| 3 | 916753E8 | Seed -> | 916753E8 | |
| 4 | 7126D6F6 | | 7126D6F6 | Perfect match, resync claimed done |
| 5 | 34BB9957 | | 34BB9957 | LOG: <Addr:5> <Resync Done> 34BB9957 |
| 6 | F020C28F | | F020C28F | LOG: <Type=PN7>, non-inverted> |
| 7 | 22CEB7D0 | Error | 22CEA7D0 | LOG: <Addr:7> 00001000 <Type=XOR> |

The next example demonstrates how to use the logged information to compute the data value present when the error occurred. In this example, an error was found in word 7. The complete logged event records for this example are:

TABLE 5

| Word Location | 32-bit XOR or Phase Data | Supervisory Information |
|---|---|---|
| 5 | 34BB9957 | Resync Done |
| 6 | | Type = PN7, non-inverted |
| 7 | 00001000 | Xor |

From this event record data, one can tell that an error was present in a word that was two words away from the location where synchronization was found (7−5=2). Further, one can tell that the error location within that word is the twelfth bit position by looking at the XOR error mask (0000100)—shown in Hexadecimal).

To find the data value for the errored bit, one simply uses the 34BB9957 as the Q[ ] values in the equation which define PN7 and advance the PN7 sequence generator 2 positions.

| | |
|---|---|
| 34BB9957 | Seed Values for Q[] |
| F020C28F | First advance of PN7 generator |
| 22CEA7D0 | Second advance of PN7 generator |

One can tell that the proper word that should have been transmitted during the error-ed word is 22CEA7D0. Knowing that the twelfth bit was in error and that non-inverted data was being used, one can derive that a 1 was actually received when a 0 was expected.

While the foregoing detailed description has described various embodiments of the method in accordance with this invention, it is to be understood that the above description is illustrative only and not limiting of the disclosed invention. Thus, while the method of the invention has been described primarily in connection with the use of pseudo-random patterned bit streams, it can also be used with any error containing predetermined sequence of bits or bit streams where the error containing bit streams are augmented with any kind of phase and data type indication that provides data information surrounding the error or errors which can be used for analysis, in addition to the specific bit error location information also obtained. This enables one to more completely analyze errors to determine their cause.

What is claimed is:

1. A method for determining the location of at least one error in a digital data stream and identifying the data surrounding the error which comprises:

(a) selecting a user data stream to be analyzed for errors, said data stream consisting of a bit stream of 0's and 1's in a predetermined sequence, (b) selecting a bit seed segment out of said data stream, and converting said bit seed segment into a reference data stream, (c) synchronizing said reference data stream with said user data stream to be tested and simultaneously storing additional information about phase and data type into a computer memory bank, (d) determining if an error exists, (e) if an error exists, calculating where on the user data stream said error occurred, (f) analyzing the data surrounding the error that is stored in the computer memory bank, and (g) computing actual data values from phase, data type and error location.

2. The method of claim 1, wherein said user data stream of (a) and said reference data stream of (b) are each 32-bit wide data streams.

3. The method of claim 2, wherein said user data stream is a true data stream.

4. The method of claim 2, wherein said user data stream is a logically inverted pseudo-random data stream selected from one having the polynomial $2^n-1$, where n=7,15,20,23, and 31.

5. The method of claim 4, wherein said polynomial is $2^7-1$.

6. The method of claim 1, wherein said synchronizing is carried out with a linear feedback shift register.

7. The method of claim 6, wherein said linear feedback shift register is loaded with a 32-bit value taken from said user data stream.

8. The method of claim 6, wherein after said synchronization is complete, a 32-bit data value from said reference stream is logged along with the word counter value representing when the synchronization was complete.

9. The method of claim 6, wherein after said synchronization is complete, a value indicating the polynomial type and whether or not the data sequence had to be inverted to successfully find synchronization is logged.

10. The method of claim 6, wherein after proper synchronization and the logging of synchronization information, 32-bit wide comparisons between the reference pattern and said user data stream is computed to find errors.

* * * * *